United States Patent Office 3,314,320
Patented Apr. 18, 1967

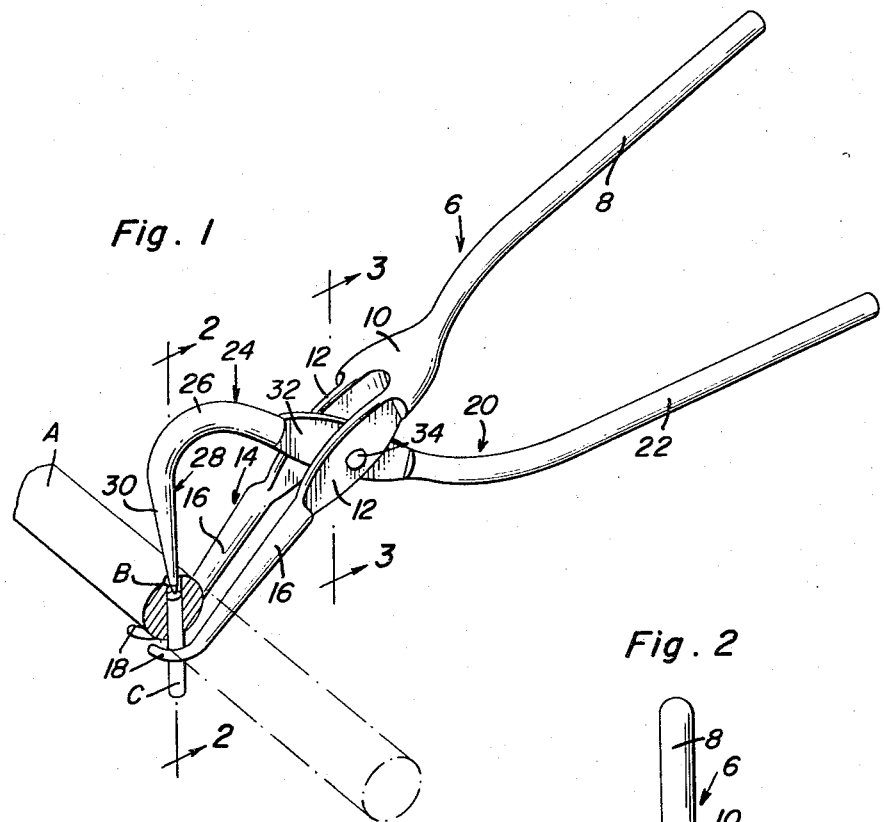
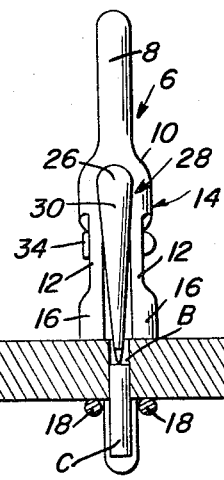
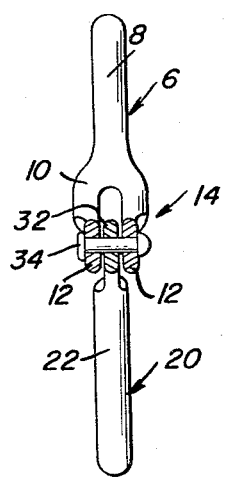

3,314,320
SHEAR PIN PLIERS
Hallie O. Early, 1407 Ave. E,
Brownwood, Tex. 76801
Filed Oct. 18, 1965, Ser. No. 497,285
5 Claims. (Cl. 81—419)

The present invention relates to hand tools, more specifically, to a pliers-like tool which is expressly designed and structurally made for urgently needed and practical use when the user is called upon to dislodge and remove a shear pin from an outboard motor shaft when, for example, stranded in a body of water.

Briefly, the improved tool comprises two lever units each of unique form. The first lever unit embodies an elongated handle provided at its forward end with an integral fork having spaced parallel arms. These arms are novel in that they are provided at terminal ends with a pair of elongated fingers constituting a claw and having free hook-like tip portions. The fingers and tip portions are oriented to bridge and seat as well as grippingly hold a portion of a shaft or similar workpiece. The second lever unit comprises an elongated handle similar to and cooperable with the first-named handle. The handle of the second lever unit is provided at its forward end with an elongated shank which passes between and in fact forwardly beyond coacting median portions of the fork arms. A median part of this shank is pivotally connected with the median portions of the arms to provide the desired crossed and jaw-like functioning of the pliers. The free forward end portion of the shank is characterized by a hook-shaped force actuated end thrust finger. This finger is aligned with the space between the arms and is movable through an arcuate path toward and from as well as through and beyond the space and the first-named fingers.

In carrying out the invention the portions of the fork arms at the point of juncture with the handle are flattened. The coacting portion of the shank is flattened and interposed between the first-named flattened portions thus providing a pivoting and connecting joint.

The forward end portions of the fork arms are gradually decreased in cross-section and tapered to provide attenuated fingers and the hook-shaped free or terminal end portions coact in providing the desired piloting, guiding and position finding placement of said fingers so that they accommodatingly seat the shaft or other workpiece therein.

It is significant to stress the fact that the shank of the second-named lever unit is bent between its end to define a hook-shaped end thrust and pin pushout finger. The finger is so related to the first-named fork fingers and so tapered and shaped and pointed that it applies the thrust action needed to properly accomplish the pin dislodging and pushout result.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in perspective showing a pair of pliers or pliers-like hand tool constructed in accordance with the invention and illustrating the manner in which the several fingers cooperate with each other and the shaft and pin in achieving the desired shaft holding and pin pushout result;

FIGURE 2 is a view, with parts in section, taken on the vertical section line 2—2 of FIGURE 1; and FIGURE 3 is a view taken on the section line 3—3 of FIGURE 1.

It is to be pointed out by way of introduction to the description of the details that the tool herein disclosed can, of course, be used when removing a cotter key or likewise employed to cope with varying job requirements on different types of machinery. However, its primary use has been and will be for removing a shear pin from a shaft opening in the manner disclosed in FIGS. 1 and 2.

The shaft in FIGS. 1 and 2 is denoted at A, the pinhole at B and the removable shear pin at C.

The first lever unit is denoted by the numeral 6. It is of onepiece construction and made of appropriate metal and embodies an elongated handle 8 having head means 10 at its outer or forward end fashioned into and providing the aforementioned fork. The portions of the fork adjacent the head 10 are suitably flattened and disposed in spaced parallelism and are denoted at 12. The fork as a unit is denoted by the numeral 14. The forward fingers, which are alike in construction, are denoted at 16 and it will be observed that these fingers are gradually decreased in cross-section, are circular in cross-section and provide the desired forwardly or outwardly tapering finger construction. The free or terminal ends of the fingers are of curvate construction and define simple hooks 18 as well as a shaft cradling or seating member. The median portions of the fingers underlie the bottom half-portion of the shaft A and the fingers terminate at about the point shown in FIG. 1. These thus hooked fingers can be described as a claw and they function to pilot, guide and position themselves to achieve the holding result desired.

The relatively movable and operable lever unit is denoted generally by the numeral 20. It is also of onepiece construction and embodies an elongated handle 22 similar to and movable toward and from the handle 8. The forward or outer end portion of this lever unit is fashioned into and provides a component part which is conveniently referred to here as a shank 24. The shank is bent or curved intermediate its ends as at 26 and constitutes and provides a hook-shaped thrust finger 28.

The bill portion of the hook-like finger is denoted at 30 and constitutes the finger proper. This finger is circular in cross-section and it decreases gradually in cross-section from the bend or bent portion 26 to its free terminal end. The finger is essentially straight and the tip portion is preferably pointed as shown best in FIG. 2. The cross-section of the overall finger is less than the space between the arms of the fork. Then, too, it will be noted that this portion 30 of the overall finger is spaced rearwardly or inwardly from the tip portions 18 of the aforementioned fingers 16 where it is thus in a position to travel through the arcuate path required for satisfactory results. That portion of the shank adjacent the flattened portions 12 is also flattened as at 32 and is sandwiched or interposed between the portions 12 where it is pivotally mounted in place as at 34.

This tool is operated like any other pair of pliers in that the handles 8 and 22 are opened and closed with the hand in a customary manner. The outer end components of the handle units could be broadly referred to as jaws but have been specifically set forth here as a fork 14, a shank at 24 and hook-shaped pushout finger at 28. With the parts thus pivotally connected together and designed and shaped as shown, it will be evident that the fingers 16 can be piloted into place with the shaft seated and virtually gripped when the relatively movable "jaw" is operated to apply end thrust pressure against the upper end of the shear pin 6 whereby to dislodge it from the opening B and push it out in the desired manner.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A pliers-type hand tool comprising: a first lever unit embodying an elongated handle provided at its forward end with an integral fork characterized by a pair of spaced parallel arms terminating in a pair of elongated claw-like fingers having free curvate tip portions oriented and coordinating to bridge, seat and grippingly hold a portion of a shaft or similar workpiece, a second lever unit complemental to said first lever unit and embodying an elongated handle similar to and cooperable with said first-named handle, the handle of said second lever unit being provided at its forward end with an elongated shank passing between and forwardly beyond median portions of the fork arms, a median portion of said shank being pivotally connected with coacting median portions of said arms, the free forward end portion of said shank embodying a hook-shaped force-applying end thrust finger aligned with the space between said arms and movable through an arcuate path toward and from as well as through and beyond said space and said first-named fingers, said fingers being gradually decreased in cross-section from their rearward toward their forward ends whereby they are thus suitably attenuated and tapered for piloting, guidance and position finding and placement needs, said tip portions being convexly rounded and blunt.

2. The structure according to claim 1, and wherein said shank is of a length that the thrust finger thereon is functional in a position spaced inwardly from the tip portion of said claw-like fingers.

3. The structure according to claim 2, and wherein the bill portion of the overall thrust finger is decreased and accordingly tapered toward the terminal tip portion, the latter being fashioned into a relatively sharp point capable of aptly engaging, dislodging and pushing a shear pin out of the shear pin hole provided therefor in a shaft, for example, an outboard motor shaft.

4. The structure according to claim 3, and wherein said fork fingers are circular in cross-section, said thrust finger being likewise circular in cross-section and, more specifically, of a cross-section less than the space between the fork arms and fingers thereon.

5. The structure defined in claim 4, and wherein said median portions of said fork arms have opposed flattened portions adjacent the coacting handle, the adjacent cooperating portion of said shank, that is, between said flattened portions, being conformingly flat, said flattened portions accommodating and supporting the pivot pin of the aforementioned pivotal connection.

References Cited by the Examiner

UNITED STATES PATENTS

| | | | |
|---|---|---|---|
| 246,062 | 8/1881 | Blaisdell | 29—268 |
| 354,153 | 12/1886 | Laufer | 294—118 |
| 641,019 | 1/1900 | Kiefer et al. | 29—268 |
| 1,064,404 | 6/1913 | Walker | 81—419 X |
| 1,985,108 | 12/1934 | Rush | 128—346 |
| 2,220,317 | 11/1940 | Cynoske | 29—248 |

WILLIAM FELDMAN, *Primary Examiner.*

MILTON S. MEHR, *Examiner.*